April 4, 1933.  A. MOORHOUSE  1,903,377

HYDRAULIC SHOCK ABSORBER

Filed May 29, 1929

Inventor
ALFRED MOORHOUSE
By Milton Tibbetts
Attorney

Patented Apr. 4, 1933

1,903,377

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

HYDRAULIC SHOCK ABSORBER

Application filed May 29, 1929. Serial No. 366,975.

This invention relates to hydraulic shock absorbers and more particularly to shock absorber metering devices for regulating the displacement of fluid in the working chamber to regulate the movement of the piston.

The fluid generally used in hydraulic shock absorbers is an oil, glycerine, or a similar liquid, the character of which varies and the viscosity of which changes with different temperatures. In order to regulate the flow of such fluid from one side of the working chamber of the shock absorber to the other to regulate the resistance to the piston movement, it is necessary to provide a restriction to the fluid flow, and it is an object of my invention to provide an adjustable metering mechanism for regulating the flow of fluid through such restriction.

Another object of my invention is to provide a hydraulic shock absorber having a metering device, for regulating the flow of fluid from one side of the piston to the other, which can be readily adjusted from the exterior of the absorber casing.

A further object of the invention is to provide a metering device for shock absorbers which can be readily assembled with and detached from the absorber casing.

Other objects of the invention will appear from the following descriptions taken in connection with the accompanying drawing which forms a part of this specification, and in which.

Figure 2:
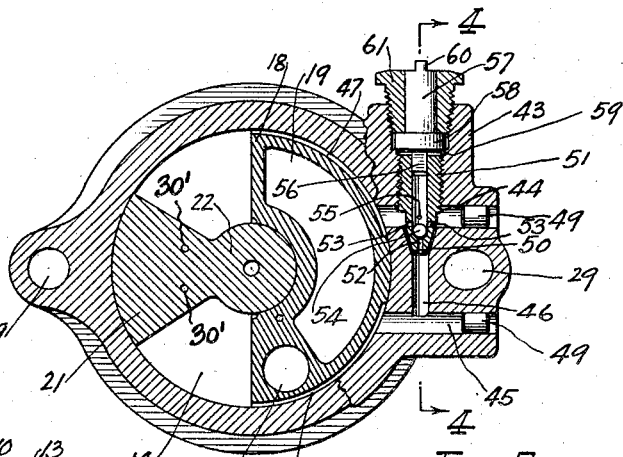
Fig. 2 is a sectional view of the same taken on line 2—2 of Fig. 1.

Referring to the drawing, 10 is the body or casing of a shock absorber having a cylindrical portion 11, an end wall 12 and a bearing portion 13. The cylindrical portion and end wall form a fluid containing chamber 14, the cylindrical portion 11 being provided with an annular end portion 15 for a purpose which will appear hereinafter, and a cover or closure 16 is inserted in the open end of the casing and is provided with an annular flange 17 positioned contiguous to the end portion 15 of the casing. The cover or closure 16 has a semi-cylindrical extension 18 fitting into the cylindrical portion 11 of the casing, the extension being preferably cored out to form an auxiliary reservoir or fluid reserve tank 19. A filling opening is provided by aligned passages in the casing and the extension 18 is closed by a plug 20. Both the working chamber and reservoir are substantially filled with oil, glycerine or a fluid having similar characteristics.

The vane piston 21 mounted to oscillate in the working chamber 14 has a shaft 22 suitably supported in the casing and cover. The packing 23 is compressed against the bearing sleeve 24 by a hollow nut 25 which is screwed on the bearing portion 13 of the casing. Outwardly of the nut 25 the shaft 22 is serrated and an arm 26 is mounted upon the serrated portion and held axially thereon by a nut 27. The shock absorber is adapted to be mounted upon a suitable support by bolts extending through openings 29 in the casing proper. The arm 26 is adapted for connection in any suitable manner to a part which moves relative to the support upon which the absorber is secured so that the piston 21 will be oscillated in the working chamber as the parts move relative to each other. The piston 21 is provided with a pair of ball check valves 30 arranged in passages 31 which communicate with the passage 32 which in turn connects with the passage 33 in the shaft 22, pins 30' extend across the passage 31 in a relation to prevent displacement of the ball check valves.

An annular leakage groove 34 is formed in the bearing sleeve 24 and a short passage 35 connects the leakage groove with the passage 33. Any fluid escaping from the working chamber in the direction of the bearing sleeve 24 will be caught by the leakage groove 34 and drawn back into the working chamber through passages 35, 33, 32 and 31, and past the check valves 30 by reason of the suction existing on the receiving side of the piston. Fluid may be drawn into the working chamber from the lowermost portion of the auxiliary reservoir 19, when needed, through connected passages 36, 37, 38, 39, 33, 32 and 31, past the check valve 30.

Figure 1:
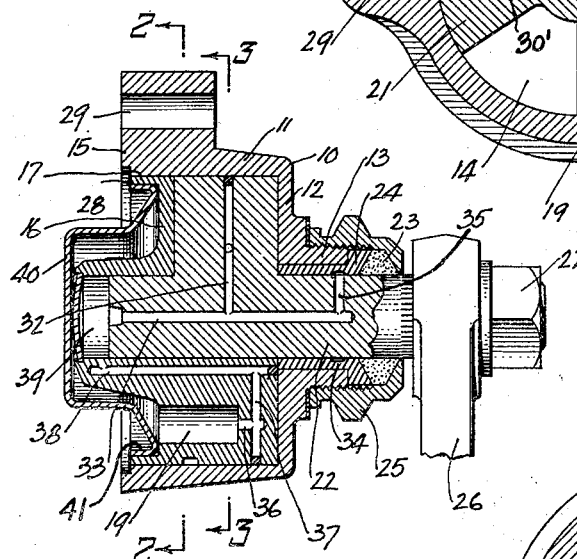
Fig. 1 is a vertical sectional view of the shock absorber taken on line 1—1 of Fig. 3, having my invention associated therewith.
Figure 3:
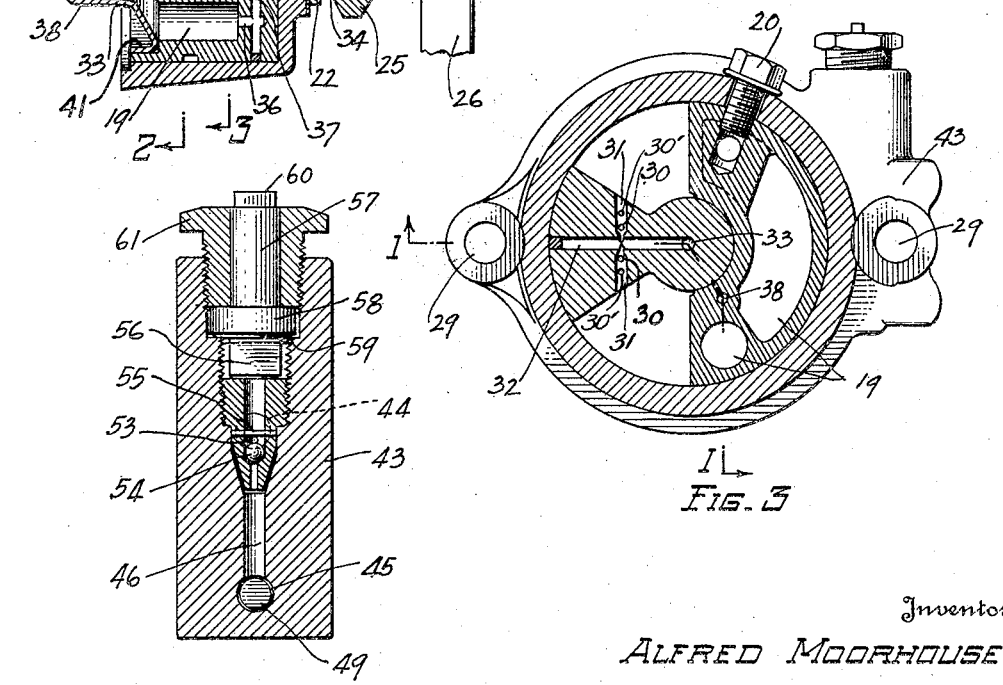
Fig. 3 is a sectional view similar to that shown in Fig. 2, but taken on line 3—3 of Fig. 1.
Figure 4:
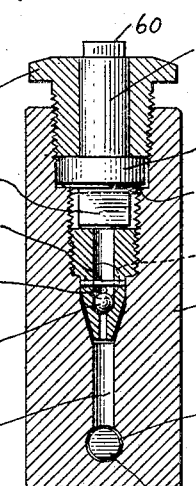
Fig. 4 is a sectional view taken on line 4—4 of Fig. 2 showing the metering device in position with the absorber.

An outer cover is provided and is in the form of a plate 40 having an annular flange 41 pressed into the cylindrical end of the inner cover 16, and such plate provides an enlargement for the reservoir 19 around the end of the cover 16. As may be seen in Fig. 1 of the drawing, the flange 41 of the outer cover telescopes within the flange 17 of the inner cover and is secured in leakproof relation therewith by welding the adjacent ends together as shown at 28. Such welded end also seals the end of the flange 17 of the inner cover with the adjacent outer casing, thus providing an integrally sealed structure of the casing, the inner cover, and the outer cover at their joints. The packing 23 at the other end of the casing prevents leakage along the shaft, so that with the welded end and the packing the casing is hermetically sealed.

The shock absorber casing is provided with a projecting boss 43 having parallel spaced passages 44 and 45 therein, which passages are connected by the passage 46. The passage 44 is connected with one end of the working chamber 14 by means of an arcuate groove 47 formed in the periphery of the closed portion of the extension 18 and the passage 45 is connected with the other end of the working chamber 14 on the opposite side of the piston 21 by an arcuate groove 48 which is formed in the periphery of the extension 18. The outer ends of the passages 44 and 45 are closed by plug members 49. It will be seen that as the piston oscillates fluid can travel from one side of the working chamber to the other through the arcuate grooves 47 and 48 and the connecting passages 44, 46, and 45. There will be no passage of fluid through the aligned passage 31 in the piston because of the one-way check valves 30, one of which will be seated through pressure of the fluid in the chamber in the direction in which the piston is oscillating. The ball valve on the suction side of the piston is open so that fluid from the reservoir or from the leakage groove can pass thereby into the suction side of the working chamber.

In order to regulate the amount of fluid flowing from one side of the working chamber to the other through arcuate grooves 47 and 48 and their connecting passages, and further, to provide for a greater flow of fluid in one direction than in the other through such grooves and passages, I provide a metering device. The upper end of the passage 46 is flared outwardly and a conical end 50 of a sleeve member 51 is arranged to be adjustably related in parallel relation with such flared passage, and the boss 43 is provided with an enlarged threaded opening extending through the upper portion thereof so that the sleeve 51 can be screwed therein to position the conical end 50 in desired relation with the flared end of the passage 46. By screwing the sleeve valve member 51 inwardly or outwardly, the distance between the flared passage and the conical end 50 can be regulated as desired to control the amount of fluid flowing from one side of the working chamber to the other through the action of the piston, and this relation will permit the same degree of fluid flow in either direction. In order to allow an additional flow of fluid from one side of the piston to the other in one direction, I provide an axial passage 52 in the end of the conical end of the valve sleeve and this passage communicates with the passage 44 through ports 53 extending laterally through the wall of the sleeve valve member. A ball 54 is arranged within the sleeve valve member to close the passage 52 when the fluid flow is in a direction from the groove 47 toward the groove 48, and a pin 55 extends transversely through the sleeve valve member to limit the upper movement of the ball when the travel of fluid is in a direction toward the groove 47. It will be seen that fluid can travel through the passage 52 when the fluid is traveling from the groove 48 toward the groove 47, but there can be no travel of fluid through the passage 52 in the opposite direction. In this manner there will be a greater resistance to rebound movement of the piston than to its movement in the opposite direction, and this arrangement is very desirable with shock absorbers used with motor vehicles.

The opening in the upper end of the sleeve valve member is of irregular form for the reception of the tongue 56 extending from a key or regulator member, 57. Such regulator member is provided with a shoulder portion 58 which is arranged to extend into and rest upon a shoulder portion 59 of the boss. It will be seen, that by rotating the regulator 57 either clockwise or anti-clockwise, that the valve sleeve 51 will be screwed toward or away from the flared end of the passage 46, so that the opening therebetween can be regulated as desired. The outer end of the regulator member 57 is provided with a protrusion 60 which may be engaged for turning the regulator. A lock nut 61 is arranged to telescope the outer end of the regulator 57 and is screwed into the outer end of the opening in the boss. By screwing the lock nut 61 into the boss so that its inner end clamps the shoulder 58 of the regulator against the shoulder 59 of the boss, rotation of the regulator is thereby prevented and when it is desired to change the adjustment of the sleeve valve member then the lock nut 61 will have to be unscrewed sufficiently to release the shoulder 58.

It will be seen that with the metering device described above, adjustment of the flow of fluid through the casing from one side of the piston to the other can readily be made from the exterior of the casing, so that desired resistance to the movement of the piston 21 can be established to compensate for different grades of fluid and to allow for viscosity changes in the fluid within the casing due to temperature changes.

Various changes can be made in the details of the device described without departing from the spirit of my invention and the scope of which is claimed.

What I claim is:—

1. In a hydraulic shock absorber, a casing structure having a fluid containing working chamber, a piston in the working chamber, said casing structure having a passage establishing communication between portions of the chamber on opposite sides of the piston, an adjustable valve member screwed into the casing wall forming the passage and co-operating therewith to regulate the flow of fluid therebetween, key means carried by the casing for adjusting the position of said member, and a clamping member for securing the key means in a stationary relation with the valve member and the casing.

2. In a hydraulic shock absorber, a casing structure forming a fluid containing working chamber, a piston in the working chamber, said casing structure having a passage therein establishing communication between portions of the chamber on opposite sides of the piston, an adjustable valve member screwed into the casing for regulating the flow of fluid thereby in the passage, a rotatable adjusting member seated in the casing and engaging the valve member, a portion of said adjusting member extending exteriorly of the casing, and a releasable member for clamping said adjustment member in fixed relation with and interiorly of the casing.

3. In a hydraulic shock absorber, a casing having a working chamber containing a fluid, a piston in the chamber, said casing being formed with a circulation passage establishing communication between portions of the chamber on opposite sides of the piston and a shouldered wall forming a passage of graduated diameters leading from the circulation passage to the exterior, a valve member screwed into the inner end of the graduated passage and extending into the circulation passage to govern the flow of fluid therethrough, a rotatable adjusting key member in the outer end of the graduated passage and engageable exterior of the casing, said valve and key member having complementary engaging surfaces, said key member having a flange set on one of the shoulders in the casing forming the graduated passage, and means for clamping the key flange against the shoulder.

4. In a hydraulic shock absorber, a casing having a working chamber adapted to contain fluid, a piston in the chamber, said casing being formed with a circulation passage establishing communication between portions of the chamber on opposite sides of the piston and a shouldered wall forming a passage of graduated diameters leading from the circulation passage to the casing exterior, a valve member screwed into the inner end of the graduated passage and extending into the circulation passage to govern the flow of fluid therethrough, a rotatable adjusting key member in the outer end of the graduated passage and engageable from the exterior of the casing, said valve and key member having complementary engaging surfaces, said key having a flange set on one of the shoulders forming the graduated passage, and a hollow nut telescoping the key member and being screwed into the outer end of the passage to clamp the key member flange against the shoulder.

In testimony whereof I affix my signature.

ALFRED MOORHOUSE.